A. SMITH.
Machine for Cutting Cracklings.
No. 61,884. Patented Feb. 5, 1867.
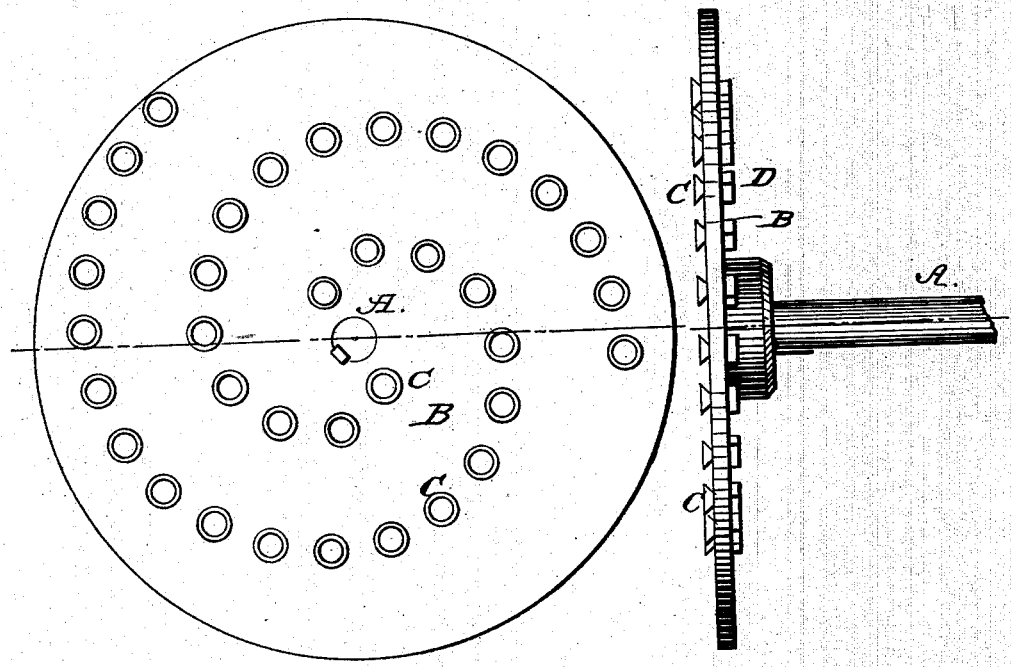

UNITED STATES PATENT OFFICE.

AMOR SMITH, OF CINCINNATI, OHIO.

IMPROVEMENT IN MACHINES FOR CUTTING CRACKLINGS.

Specification forming part of Letters Patent No. 61,884, dated February 5, 1867.

*To all whom it may concern:*

Be it known that I, AMOR SMITH, of Cincinnati, in the county of Hamilton and State of Ohio, have invented a new and useful Improvement in Cutters for Reducing Cracklings and other pressed animal matter to a fit condition for use as a fertilizer or otherwise; and I do hereby declare that the following is a full, clear, and exact description of the same, reference being had to the annexed drawings, making part of this specification, in which—

Figure 1 is a plan, and Fig. 2 is a side elevation.

The same letters are employed in both figures in the indication of identical parts.

A is the shaft, which I shall ordinarily set horizontally and operate by mechanism which I will hereafter describe in a separate application. C is a circular plate attached to the shaft and revolved by it. This plate has a face with an even surface, from which project the cutting-teeth C, which, as shown, are formed with flaring sides and concave faces, so as to form sharp cutting edges. These teeth pass through the plate, and are held in place by the nuts D.

Cracklings are first pressed on being taken from the kettle, so as to extract all the lard that can be saved. They are thus compressed into solid blocks, and are unfit for use. By subjecting them to the action of my cutters they are reduced to fit condition to be used, and become valuable in agriculture.

What I claim as my invention, and desire to secure by Letters Patent, is—

A cutter for reducing compressed animal matter, constructed substantially as described.

In testimony whereof I have signed my name to this specification in the presence of two subscribing witnesses.

AMOR SMITH.

Witnesses:
AMOR SMITH, Jr.,
E. GILLIGAN.